US008161054B2

(12) United States Patent
Dettinger et al.

(10) Patent No.: US 8,161,054 B2
(45) Date of Patent: Apr. 17, 2012

(54) DYNAMIC PAGING MODEL

(75) Inventors: Richard D. Dettinger, Rochester, MN (US); Frederick A. Kulack, Rochester, MN (US); Kevin G. Paterson, San Antonio, TX (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/418,127

(22) Filed: Apr. 3, 2009

(65) Prior Publication Data

US 2010/0257155 A1  Oct. 7, 2010

(51) Int. Cl.
  *G06F 17/00* (2006.01)
(52) U.S. Cl. ........................................... 707/752
(58) Field of Classification Search ............... 707/749, 707/752
See application file for complete search history.

(56) References Cited

U.S. PATENT DOCUMENTS

| | | | | |
|---|---|---|---|---|
| 5,537,586 A * | 7/1996 | Amram et al. | ......................... | 1/1 |
| 6,104,989 A * | 8/2000 | Kanevsky et al. | ................. | 704/9 |
| 6,385,602 B1 * | 5/2002 | Tso et al. | .............................. | 1/1 |
| 6,718,338 B2 * | 4/2004 | Vishnubhotla | ........................ | 1/1 |
| 6,910,037 B2 * | 6/2005 | Gutta et al. | .................... | 707/730 |
| 7,028,258 B1 * | 4/2006 | Thacker et al. | ................ | 715/209 |
| 7,251,643 B2 * | 7/2007 | Gange et al. | .................. | 707/749 |
| 7,386,554 B2 * | 6/2008 | Ripley et al. | ........................... | 1/1 |
| 7,769,751 B1 * | 8/2010 | Wu et al. | ........................ | 707/728 |
| 7,814,085 B1 * | 10/2010 | Pfleger et al. | ................. | 707/708 |
| 2003/0233432 A1 * | 12/2003 | Davis et al. | ................... | 709/222 |
| 2006/0031764 A1 * | 2/2006 | Keyser et al. | ................. | 715/525 |

* cited by examiner

*Primary Examiner* — James Trujillo
*Assistant Examiner* — Jorge A Casanova
(74) *Attorney, Agent, or Firm* — Patterson & Sheridan LLP

(57) ABSTRACT

Techniques are disclosed for determining a dynamic breaking point in a sequence of records generated in response to a user request. The sequence may include a first result and an ideal breaking point. In particular, a current, prior, and next record may be analyzed to determine a page-change factor indicating similarities between the records. The prior, current, and next records are sequential and the current record may be located within a pre-determined distance from the ideal breaking point. If the page-change factor indicates that the current record is more similar to the next record than to the prior result, the dynamic breaking point is inserted prior to the current record.

19 Claims, 9 Drawing Sheets

| PATIENT | LAB RESULT | TEST LOCATION | DOCTOR |
|---------|------------|---------------|--------|
| 1 | 123 | A | SMITH |
|   |     |   | ⋮ |
| 1 | 123 | A | JONES |
| 1 | 256 | A | SMITH |
| 1 | 266 | A | JONES |
| 1 | 334 | B | JONES |
| 1 | 434 | B | JONES |
| 1 | 532 | A | SMITH |
| 1 | 643 | B | SMITH |

| | PATIENT | LAB RESULT | TEST LOCATION | DOCTOR |
|---|---|---|---|---|
| 602 → | 1 | 123 | A | SMITH |
| | | | | ⋮ |
| 604 → | 1 | 123 | A | JONES |
| 606 → | 1 | 256 | A | SMITH |
| 608 → | 1 | 266 | A | JONES |
| 610 → | 1 | 334 | B | JONES |
| | —————————— PAGE —————————— | | | |
| 612 → | 1 | 434 | B | JONES |
| 614 → | 1 | 532 | A | SMITH |
| 616 → | 1 | 643 | B | SMITH |

FIG. 6A   300

| | PATIENT | LAB RESULT | TEST LOCATION | DOCTOR |
|---|---|---|---|---|
| 602 → | 1 | 123 | A | SMITH |
| | | | | ⋮ |
| 604 → | 1 | 123 | A | JONES |
| 606 → | 1 | 256 | A | SMITH |
| | —————————— PAGE —————————— | | | |
| 608 → | 1 | 266 | A | JONES |
| 610 → | 1 | 334 | B | JONES |
| 612 → | 1 | 434 | B | JONES |
| 614 → | 1 | 532 | A | SMITH |
| 616 → | 1 | 643 | B | SMITH |

FIG. 6B   300

| | PATIENT | LAB RESULT | TEST LOCATION | DOCTOR |
|---|---|---|---|---|
| 602 → | 1 | 123 | A | SMITH |
| | | | | ⋮ |
| 604 → | 1 | 123 | A | JONES |
| 606 → | 1 | 256 | A | SMITH |
| 608 → | 1 | 266 | A | JONES |
| | —————————— PAGE —————————— | | | |
| 610 → | 1 | 334 | B | JONES |
| 612 → | 1 | 434 | B | JONES |
| | —————————— PAGE —————————— | | | |
| 614 → | 1 | 532 | A | SMITH |
| 616 → | 1 | 643 | B | SMITH |

FIG. 6C   300

DYNAMIC PAGING MODEL

BACKGROUND OF THE INVENTION

1. Field of the Invention

Embodiments of the present invention generally relate to data processing, and more particularly, to techniques for determining dynamic breaking points in pages of results generated in response to a user request.

2. Description of the Related Art

Databases are well known systems for storing, searching, and retrieving information stored in computer systems. A particularly common type of database is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. Pat. No. 6,996,558 (the '558 patent) entitled "Application Portability and Extensibility through Database Schema and Query Abstraction," discloses techniques for constructing a database abstraction model over an underlying physical database.

The '558 patent discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

In response to a specific request, a respective query is executed against a database and query results are returned to the requesting entity, e.g., for display to a user. The query results are often displayed to the user in tabular form and are divided into pages containing multiple rows. The user may access the query results page-by-page.

SUMMARY OF THE INVENTION

One embodiment of the invention provides a computer-implemented method for determining for determining one or more dynamic page breaks to include in a database query result generated in response to a user request. The method may generally include receiving the database query result, wherein the database query result includes a plurality of records in a specified sequence. The method may also include evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record. Upon determining the page-change factor indicates that the first record is more similar to the record following the first record than to the record prior to the first record a dynamic page break may be inserted in the database query result. In such a case, the first record is assigned to a page following the dynamic page break.

In a particular embodiment, upon determining the page-change factor indicates that the first record is more similar to the record prior to the first record than to the record following the first record, relative to the sequence, at least the record following the first record of the sequence is evaluated, sequentially, to determine at least a second page-change factor. The sequential evaluation may continue until a dynamic page break is inserted, based on the page change factor determined for one of the records following the first record. In such a case, at least the first record is assigned to a page preceding the dynamic page break.

Another embodiment of the invention includes a computer-readable storage medium containing a program which, when executed, performs an operation for determining one or more dynamic page breaks to include in a database query result generated in response to a user request. The operation may generally include receiving the database query result. The database query result may include a plurality of records in a specified sequence. The operation may also include evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record. Upon determining the page-change factor indicates that the first record is more similar to the record following the first record than to the record prior to the first record a dynamic page break may be inserted in the database query result. In such a case, the first record is assigned to a page following the dynamic page break.

Still another embodiment of the invention includes a system having a processor and a memory storing an application, which, when executed by the processor is configured to perform an operation for determining one or more dynamic page breaks to include in a database query result generated in response to a user request.

The operation may generally include receiving the database query result. The database query result may include a plurality of records in a specified sequence. The operation may also include evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record. Upon determining the page-change factor indicates that the first record is more similar to the record following the first record than to the record prior to the first record a dynamic page break may be inserted in the database query result. In such a case, the first record is assigned to a page following the dynamic page break.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates a tabular sequence of results generated in response to a user request, according to one embodiment of the invention;

FIG. 6A illustrates a sequence of results with an ideal breaking point, according to one embodiment of the invention;

FIG. 6B illustrates a sequence of results having a dynamic breaking point identified, according to one embodiment of the invention; and FIG. 6C illustrates a sequence of results having a dynamic breaking point identified, according to one embodiment of the invention.

DETAILED DESCRIPTION OF THE PREFERRED EMBODIMENTS

Figure 1:
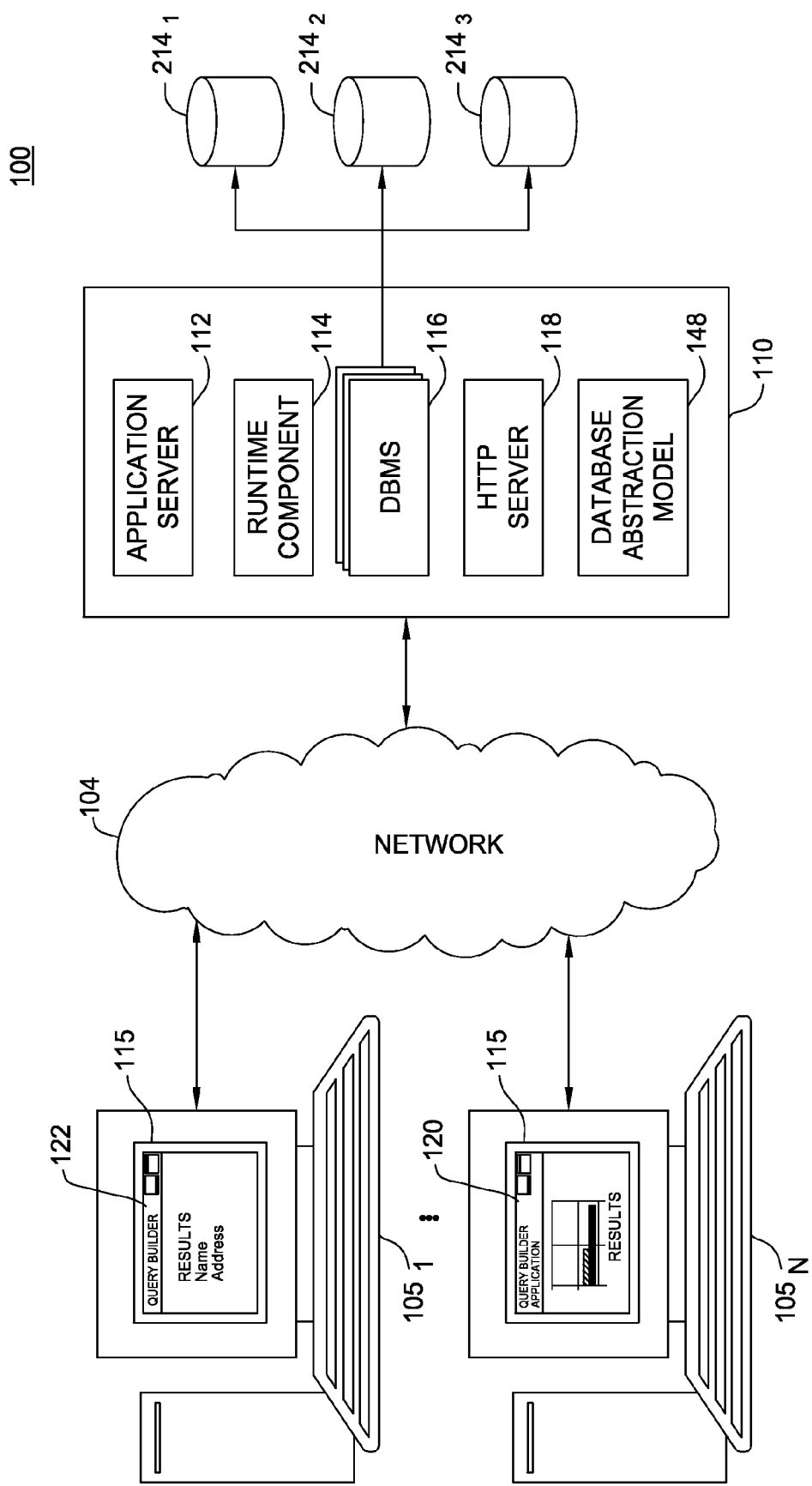
FIG. 1 illustrates a network environment using a client-server configuration, according to one embodiment of the invention.

Displaying results for user requests as a collection of pages is common in web applications. For example, search engine results are frequently broken up as a set of pages with a fixed number of hits on each page. Similarly, database query tools often list results of executing SQL against a database as a tabular set of results, where the tool may return a fixed number of rows to show per page. This approach is efficient as it limits the number of results that have to be processed all at once for rendering on the screen (e.g., it is unnecessary to build, transmit, and have rendered a web page with thousands of rows of data). This approach is also beneficial for the user because they get relevant data more quickly (without having to wait for a page with thousands of rows of data to download) and the user may not care about the results further down a page (e.g., a user may not really to care about any of the search results on the 200th page).

In some cases, however, related information ends up being grouped on different pages—resulting in the user have to jump back and forth between pages. For example, rows in a tabular query result may be related. Consider an example of medical diagnosis test results for group of patients. If one patient has 5 diagnosis tests, but a page size is fixed to 3, then the patients data ends up being spread across two pages. The user has to click the next page to see if there are more results (in this case there are two) and then click back to see the first rows again, all because an arbitrary value of 3 was determined for the page number.

Embodiments of the invention allow page sizes to be determined dynamically as pages are generated based on the "relatedness" between one record and the next and, in some cases, on an "ideal" page size. For example, if an "ideal" number of results on a page is specified as 100, a number of results displayed on a particular page may be lesser (e.g., 90) or greater (e.g., 110). More specifically, a dynamic breaking point is determined by analyzing similarities of results from row to row. In one embodiment, the data analyzed to identify whether one row is more related to the previous (or following) row may come from the users request directly (e.g., where the user requests data records to be grouped in a particular way). Generally, a dynamic breaking point defines where one page should end and another page should begin. For example, assume that a user requests laboratory records, where each record includes a patient name and a laboratory where the patient's test has been performed. Assume further that the results provide a sequence of records for one patient immediately followed by another sequence of several records for another patient (that is, the records are grouped by patient). If the number of results displayed on a page is fixed, then sequence of results for one patent may end up being broken into two parts with one part being displayed on one page and another part being displayed on another page.

In one embodiment, a database component configured to generate a result set may cluster the records for the first patient on a single page, even when doing so results in the total number of the records on the page to be greater than a specified "ideal" page size. Or conversely, when doing results in the total number of records on the page to be less than the "ideal" page size. In particular, rows are evaluated sequentially, until a page-breaking point is determined. That is, each sequential record in a result is compared to the next row and the previous row to determine whether it is more similar to the preceding one than the succeeding one. Thus, in the example above the last record of the first patient would be considered more similar to the preceding row (i.e., to another record of the first patient) than to the succeeding row (i.e., the first record of the second patient). Thus, in the present example, the records of the second patient are displayed on the following page.

In one embodiment, although results are displayed using flexible size pages, the number of results are determined for each page so that the records in each page remain relatively close to an "ideal" number of records per page. To achieve this, in one embodiment, only results that are within a predetermined distance from an ideal breaking point are analyzed (i.e., within a set number of records of an breaking point). For example, if an ideal page number is 100 and it is desirable to have at least 80 records on a page, only records following record 80 on the current page are analyzed to determine whether to insert a dynamic breaking point. Further, to assure that the number of the results displayed on the page is not unlimited, a penalty value may be increased every time a result that is further in the sequence from the ideal breaking point is analyzed. As the penalty value grows, at some point, a page-change factor would indicate that the current result is more similar to the succeeding neighbor than to the preceding neighbor even if this is not actually the case (as a result of the influence of the penalty factor).

This may prevent pages of an unreasonable size from being created. For example, assume that the ideal page number is 100 and that it is desirable for a page to include between 80 and 120 results. Assume further, that the number of records in the first patient sequence of the example above is 200. Then, in an embodiment with no penalty value, all 200 records might be displayed on one page. In contrast, in an embodiment where a penalty value is employed, after record 100 has been analyzed, the penalty value increases with each new record being analyzed. Because the penalty increases with each record following record 100, before record 120 is reached, the penalty value would affect the calculation of a page-change factor such that, eventually, a page break is identified and inserted into result set.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computing system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system 105 using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system 105. The web-browser 122 and application 120 may be configured to allow a user to compose an abstract query, and to submit the query to the runtime component 114 for processing.

As illustrated in FIG. 1, server system 110 may further include runtime component 114, database management system (DBMS) 116, and database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) statements from an abstract query. The resolved queries generated by the runtime component 114 are supplied to DBMS 116 for execution. Additionally, the runtime component 114 may be configured to modify the resolved query with additional restrictions or conditions, based on the focus of the abstract query, i.e., based on the model entity specified for a given query.

Figure 2A:
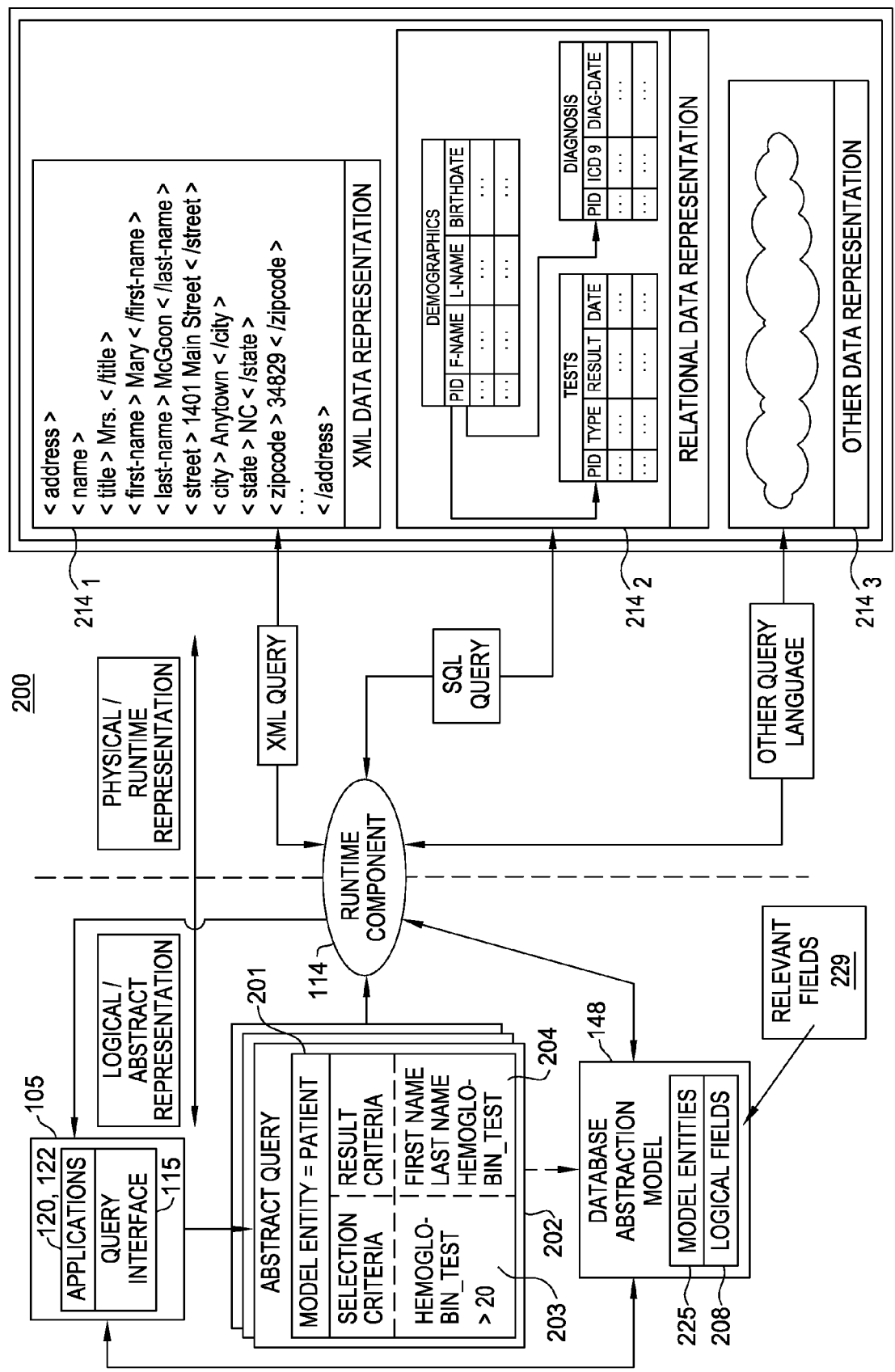
FIGS. 2A-2D illustrate a logical view of a database abstraction model constructed over an underlying physical database, according to one embodiment of the invention.

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208, model entities 225, and relevant fields 229. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility," etc). For example, abstract query 202 includes an indication that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

As stated, in one embodiment, an abstract query may specify a type of model entity being queried (e.g., a patient, an employee or a test). That is, a model entity defines the focus, or central concept, for an abstract query. Rather than compose a query data based on the structure of an underlying database (e.g., an SQL schema), users compose a query about a model entity (e.g., about a patient) by specifying which logical fields should be used to evaluate whether a given instance of the model entity should be included in the query results. Doing so allows users to compose complex queries in a straightforward and intuitive manner. However, as stated, not all logical fields 208 are typically going to be related to each of the model entities 225. Thus, an interface that presents a complete collection of logical fields 208 to a user may become cluttered and confusing, at best, or worse, may allow users to compose an abstract that cannot be resolved into a corresponding physical query. The use of model entities to provide a focus for abstract queries is described in commonly assigned U.S. Pat. No. 7,054,877 (the '877 patent) entitled "Dealing with Composite Data through Data Model Entities."

In one embodiment, relevant fields 229 identify which logical fields 208 are relevant to a given model entity 225. As used herein, "relevant fields" are logical fields 208 that store data related to a given model entity 225 and are available to include in an abstract query 202 directed to that model entity 225. The particular logical fields 208 which are available may include the complete set of "relevant fields" but may also include a subset of those logical fields. As stated, for example, logical fields associated with a model entity may be marked as unavailable in a given case due to database resources that are unavailable to the user composing an abstract query based on a user profile. That is, the user may be authorized to compose a query regarding a given model entity, but may not be authorized to access everything about that entity available through the relevant logical fields. Similarly, if database resources are unavailable or under development, logical fields that reference such resources may be marked as unavailable. As another example, logical fields may be made unavailable when their use in an abstract given query would exceed the system resources from a complexity or performance perspective (or resources allocated to a given user).

Thus, in one embodiment, a user of query interface 115 composing an abstract query 202 for a specific model entity 225 may be presented with only the relevant fields 229 that correspond to that model entity 225.

In one embodiment, relevant fields 229 may be generated at a start-up time for a computer system (e.g., server system 110). Alternatively, relevant fields 229 may be generated periodically (e.g., daily, weekly, monthly, etc.) or whenever a change is made to a related part of database abstraction model 148, for example adding/modifying a logical field, adding/modifying a model entity, adding/modifying a relationship, etc.

In another embodiment, relevant fields 229 may be generated when a given user logs in or when the user composes an abstract query directed to a particular model entity. In such a case, the relevant logical fields may be evaluated dynamically based on a user profile, and only the logical field associated with the model entity (and not marked unavailable) are presented in to the user (e.g., as part of query interface 115). Relevant fields 229 may be stored by any suitable technique, for example in a database table, in an XML data file, and the like.

In one embodiment, runtime component 114 retrieves data from physical database 214 by generating a resolved query (e.g., an SQL statement) from abstract query 202. Because database abstraction model 148 is not tied to either the schema of physical database 214 or the syntax of a particular query language, additional capabilities may be provided by database abstraction model 148 without having to modify the underlying database. Further, depending on the access method specified for a logical field, runtime component 114 may transform abstract query 202 into an XML query that queries data from database 214$_1$, an SQL query of relational database 214$_2$, or other query composed according to another physical storage mechanism using other data representation 214$_3$, or combinations thereof (whether currently known or later developed).

Figure 2B:
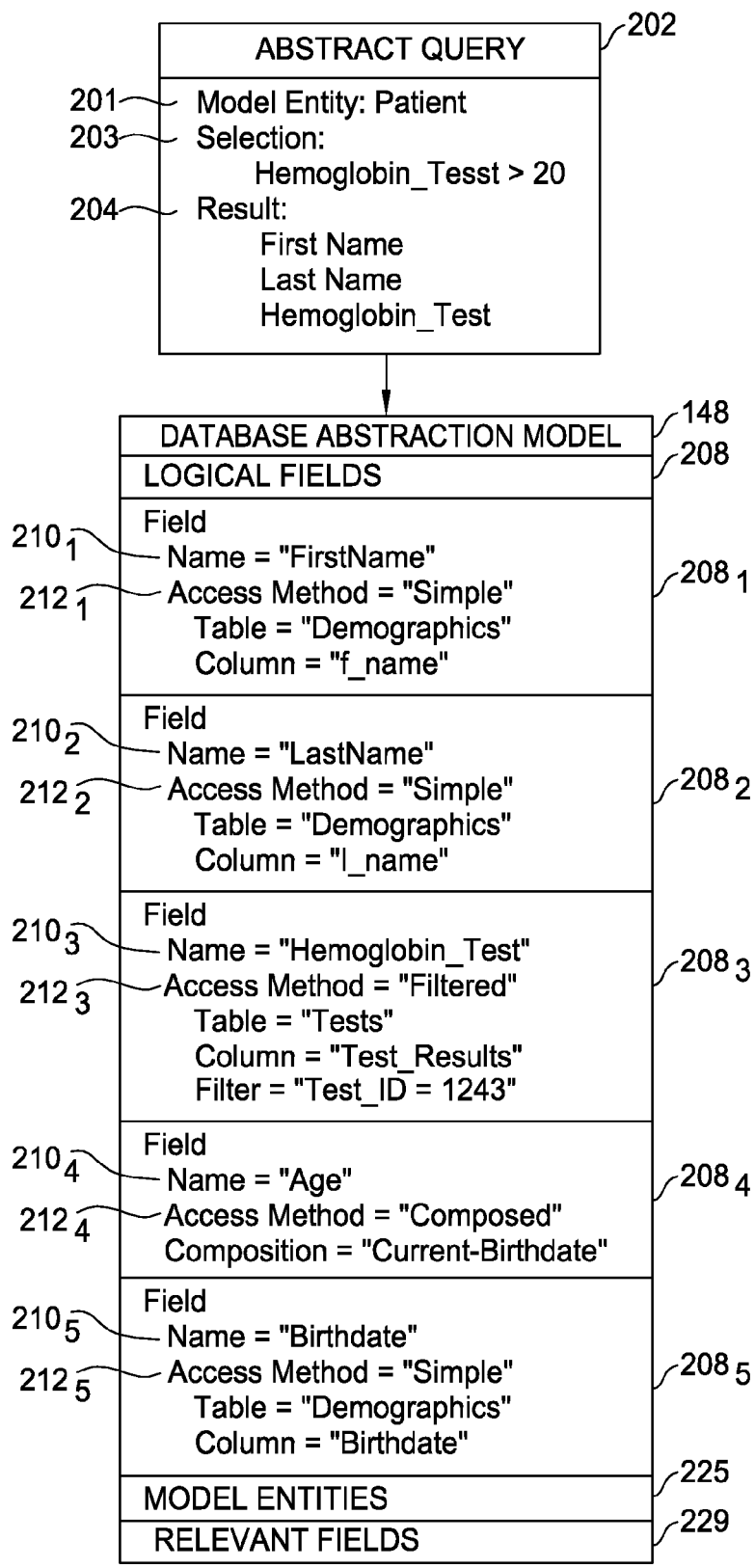
Figure 2C:
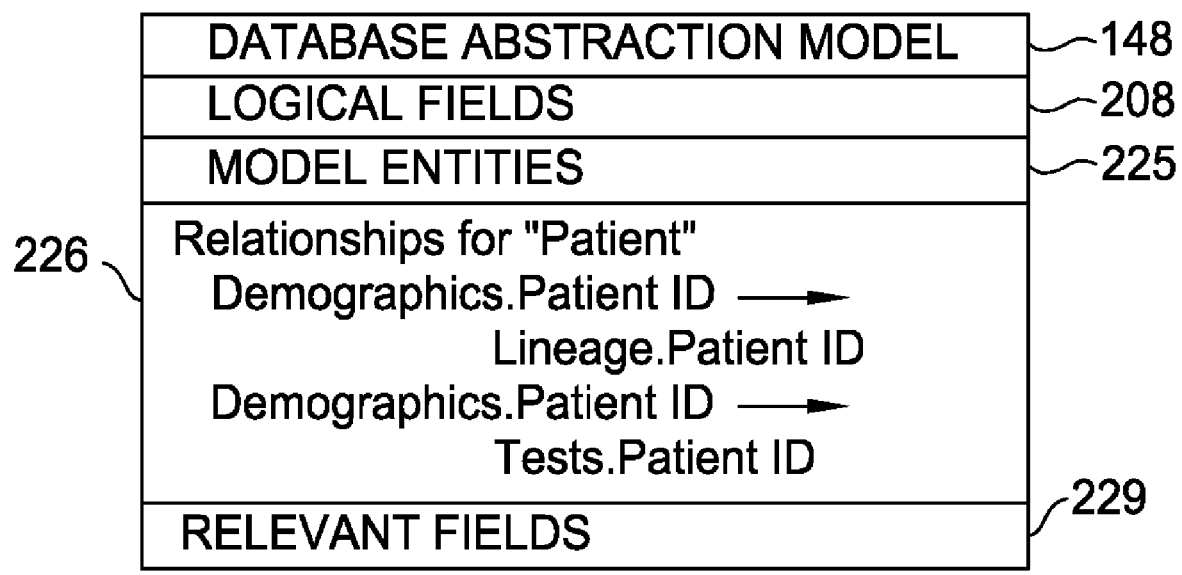
Figure 2D:
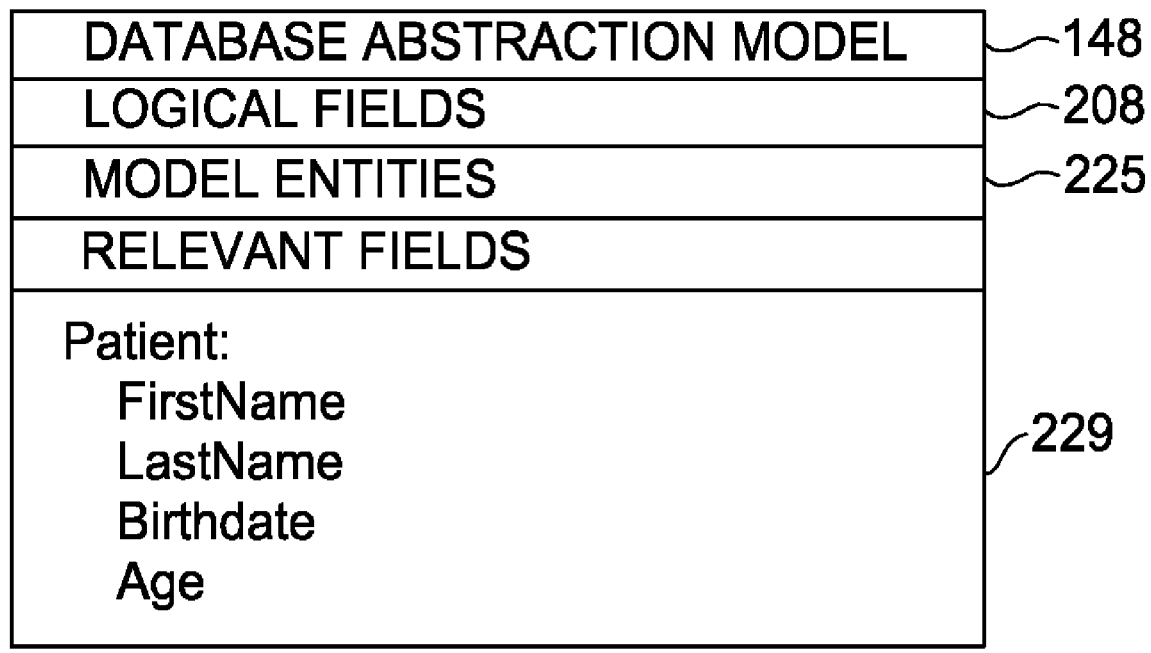

FIGS. 2B-2D illustrate an exemplary abstract query 202, relative to the database abstraction model 148, according to one embodiment of the invention. As shown in FIG. 2B, abstract query 202 includes selection criteria 203 indicating that the query should retrieve instances of the patient model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using eXtensible Markup Language (XML). In one embodiment, query interface 115 may be configured to enable a user to compose an abstract query, and to generate an XML document to represent the finished abstract query. Those skilled in the art will recognize that XML is a well known markup language used to facilitate the sharing of structured text and information, other markup languages, however, may be used.

TABLE I

Query Example

```
001  <?xml version="1.0"?>
002  <!--Query string representation: ("Hemoglobin_test > 20")
003  <QueryAbstraction>
004    <Selection>
005      <Condition>
006        <Condition field="Hemoglobin Test" operator="GT"
              value="20"
007      </Condition>
008    </Selection>
009    <Results>
010      <Field name="FirstName"/>
011      <Field name="LastName"/>
012      <Field name="hemoglobin_test"/>
013    </Results>
014    <Entity name="Patient" >
015        <FieldRef name="data://patient/PID" />
016        <Usage type="query" />
017    </EntityField>
018    </Entity>
019  </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Lines 14-18 identify the model entity selected by a user, in this example, a "Patient" model entity. Thus, the query results returned for abstract query 202 are instances of the "Patient" model entity. Line 15 indicates the identifier in the physical database 214 used to identify instances of the model entity. In this case, instances of the "Patient" model entity are identified using values from the "Patient ID" column of a patient table.

After composing an abstract query, a user may submit it to runtime component 114 for processing. In one embodiment, runtime component 114 may be configured to process abstract query 202 by generating an intermediate representation of abstract query 202, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in abstract query 202, and further identify how to join columns of data together. Runtime component 114 may then parse the intermediate representation in order to generate a physical query of the underlying physical database (e.g., an SQL statement(s)). Abstract query plans and query processing are further described in a commonly assigned U.S. Pat. No. 7,461,052 (the '052 patent) entitled "Abstract Query Plan."

FIG. 2B further illustrates an embodiment of a database abstraction model 148 that includes a plurality of logical field specifications 208$_{1-5}$ (five shown by way of example). The access methods included in logical field specifications 208 (or logical field, for short) are used to map the logical fields 208 to tables and columns in an underlying relational database (e.g., database 214$_2$ shown in FIG. 2A). As illustrated, each field specification 208 identifies a logical field name 210$_{1-5}$ and an associated access method 212$_{1-5}$. Depending upon the different types of logical fields, any number of access methods may be supported by database abstraction model 148. FIG. 2B illustrates access methods for simple fields, filtered fields, and composed fields. Each of these three access methods are described below.

A simple access method specifies a direct mapping to a particular entity in the underlying physical database. Field specifications 208$_1$, 208$_2$, and 208$_5$ each provide a simple access method, 212$_1$, 212$_2$, and 212$_5$, respectively. For a relational database, the simple access method maps a logical field to a specific database table and column. For example, the simple field access method 212$_1$ shown in FIG. 2B maps the logical field name 210$_1$ "FirstName" to a column named "f_name" in a table named "Demographics."

Logical field specification 208$_3$ exemplifies a filtered field access method 212$_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field 208$_3$ illustrates a hypothetical "Hemoglobin Test." The access method for this filtered field 212$_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical filed $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of database abstraction model 148, or other logical field specifications, may map to other physical data representations (e.g., databases $214_1$ or $214_3$ illustrated in FIG. 2A). Further, in one embodiment, database abstraction model 148 is stored on computer system 110 using an XML document that describes the model entities, logical fields, access methods, and additional metadata that, collectively, define the database abstraction model for a particular physical database system. Other storage mechanisms or markup languages, however, are also contemplated.

Referring to FIG. 2C, database abstraction model 148 also includes model entities 225. Illustratively, only a single model entity 225 is shown, for the model entity "Patient." As shown, model entity 225 includes a set of relationships 226 which identify data available in database 214 that is related to instances of the "Patient" model entity. For example, the first model entity relationship 226 indicates that data from a "Demographics" table and a "Lineage" table are linked by columns named "Patient ID." Further, the second model entity relationship 226 indicates that data from the "Demographics" table and a "Tests" table are linked by columns named "Patient ID." Collectively, relationships 226 define the "universe" of data about the model entity 225 stored in the underlying physical database 214. That is, relationships 226 specify what physical tables and fields are accessible for a given model entity 225.

Referring to FIG. 2D, database abstraction model 148 also includes relevant fields 229. As shown, relevant fields 229 correspond to the "Patient" model entity 225, and include the logical fields "FirstName," "LastName," "Birthdate" and "Age." As described above, relevant fields 229 may identify the logical fields 208 of database abstraction model 148 that are relevant to a given model entity 225. In one embodiment, relevant fields 229 may be generated from relationships 226 and logical fields 208.

Figure 4:
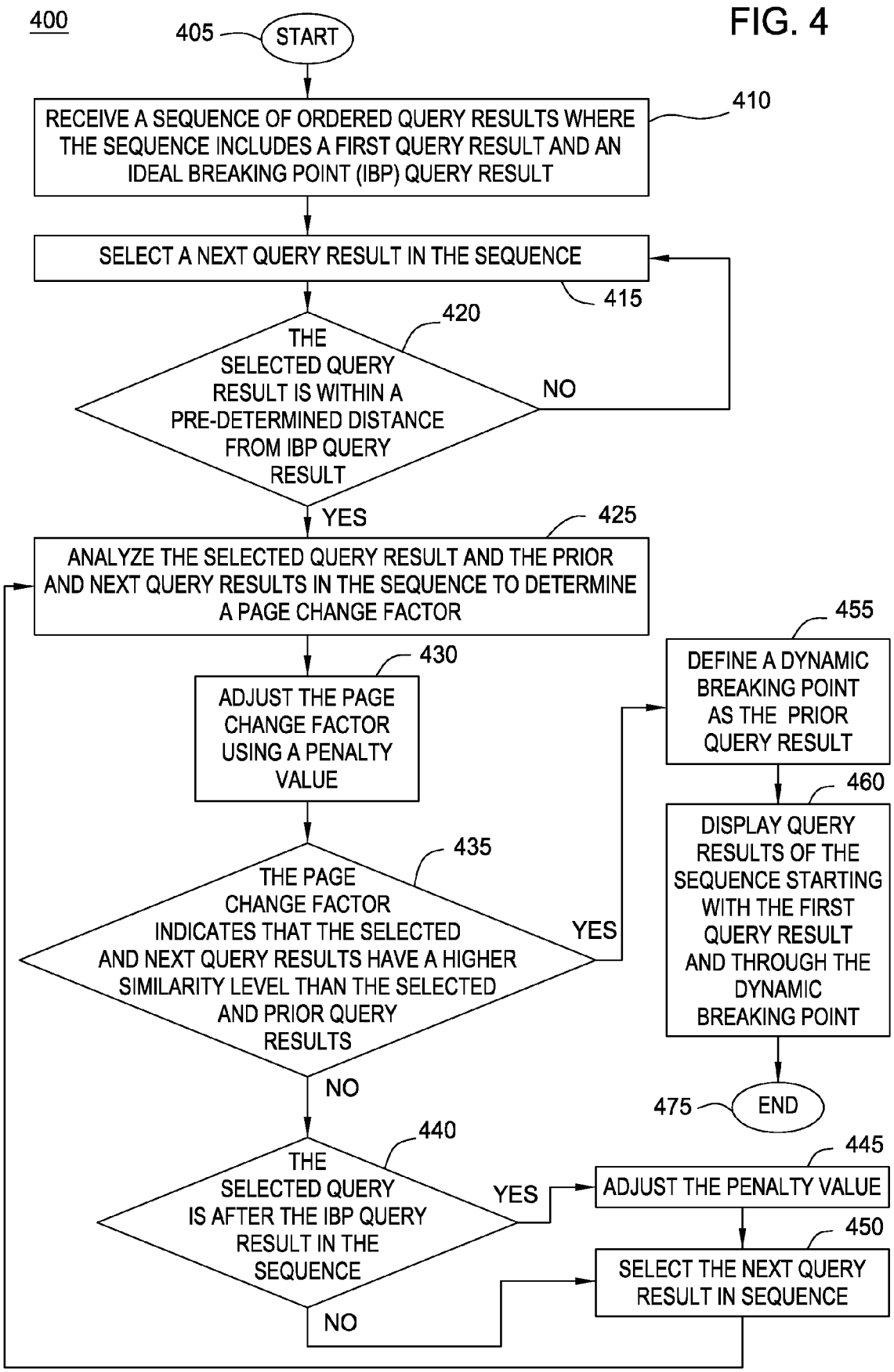
FIG. 4 is a flow diagram illustrating a method for determining a dynamic breaking point in a sequence of results, according to one embodiment of the invention.
Figure 5:
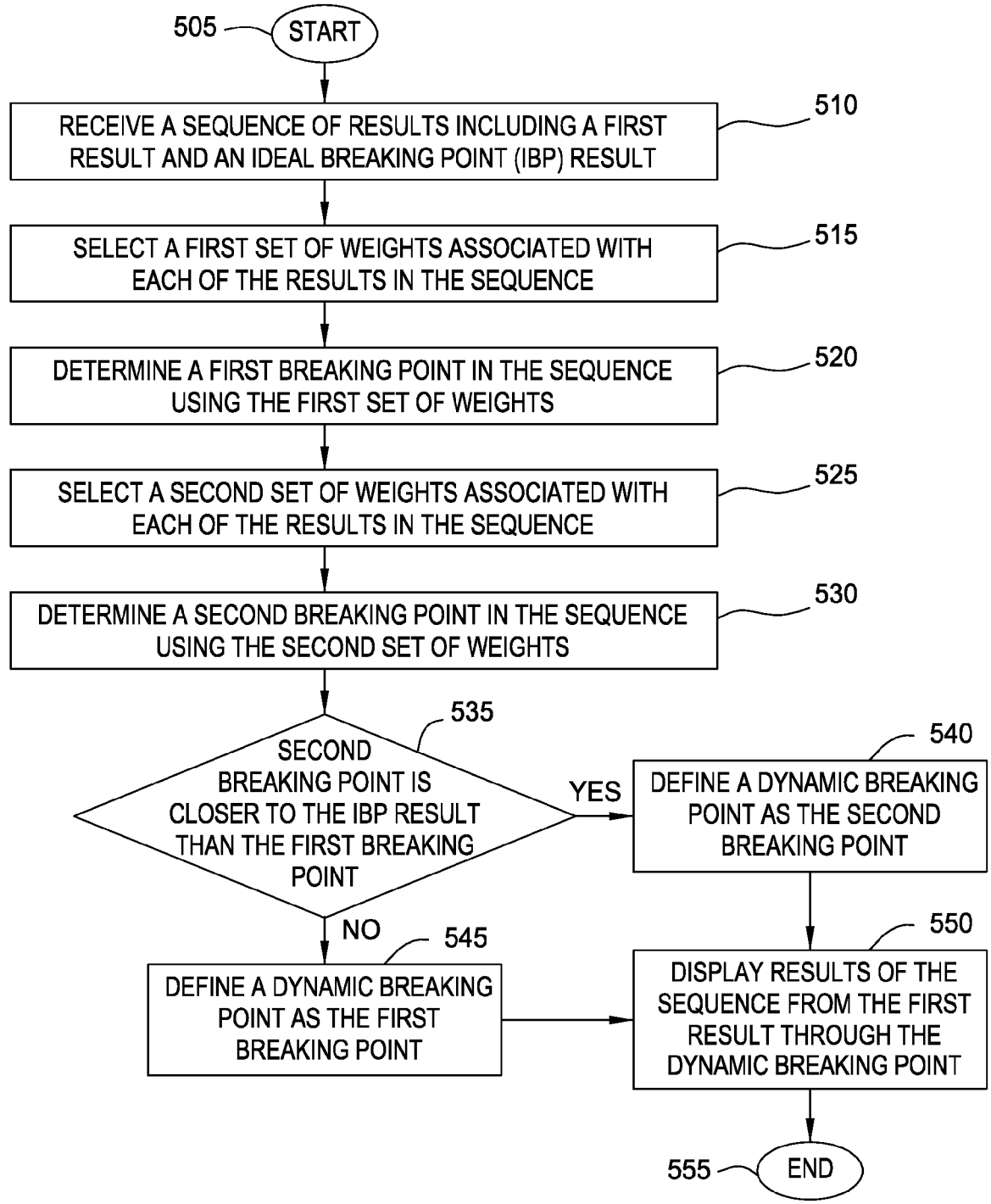
FIG. 5 is a flow diagram further illustrating a method for determining a dynamic breaking point in a sequence of results, according to one embodiment of the invention.

To facilitate the explanation of methods illustrated in FIGS. 4 and 5, a specific example of a sequence of results is used. FIG. 3 illustrates a sequence 300 of results generated in response to a user request, for example, the following query:

SELECT PATIENT LAB RESULT FROM DATABASE WHERE LAB RESULT EXISTS ORDER BY PATIENT, LAB, RESULT

In particular, two fields are queried (i.e., 'patient' and 'lab result') and the results are ordered by 'patient' first and by 'lab result' second. Results returned for this example query may include additional information, such as 'test location' and 'doctor' (as part of the data for the "lab result"). As described below in greater detail, different weights may be associated with query criteria and/or fields to influence the process of determining a breaking point.

FIG. 4 is a flow diagram illustrating a method for determining a dynamic breaking point in a sequence of results, according to one embodiment of the invention. The method starts at step 410 where a sequence of results is received in response to a query, such as the sequence 300 shown in FIG. 3. Note, the sequence of results may be received by an application server 112 and HTTP server 118, prior to being returned to a client as a number of distinct pages. For example, as described above, a user may interact with a client application to compose and submit a query for execution. In such a case, the application server 112 may send the query to runtime component 114 and/or DBMS 116 for execution. In response, the DMBS 116 may execute the query and generate a set of query results returned to the application server 112. In turn, the application server 112 may evaluate the sequence of results and insert dynamic breakpoints where it determines them to be appropriate. Further, in such a case, the application server 112 may generate a page (e.g., formatted HTML) that includes only the records included in the first page and return this result to the client application. As the client application requests subsequent pages, such pages may be generated (according to the dynamic break points) and returned to the use.

Illustratively, the sequence 300 includes a first result (shown as record 602 in FIG. 6A) and an ideal breaking point (IBP) result (the point following record 610 in FIG. 6A illustrated as a dashed line labeled "PAGE"). Record 602 provides a first result to include in the first page. In one embodiment, results of sequence 300 are ordered according to at least one request element (e.g., elements of abstract query 202 of FIG. 2, such as model entity 201, selection criteria 203, result criteria 204, and so on) and/or result element (e.g., such as a logical field 208 of abstraction model 148).

In one embodiment, the results of sequence 300 are analyzed sequentially starting with the first result. Each record is compared to adjacent records to determine which group the result fits the best, i.e., a preceding or succeeding group. Such analyses facilitate the determination of the best page breaking point in the sequence of the results. However, as it might be desirable to keep the number of records included in a page relatively close to an ideal page number, in one embodiment, only records within a pre-determined distance from the IBP result are analyzed to determine whether to insert a break point. In other words, the dynamic breaking point (i.e., records within a specified distance of the "PAGE" break shown in FIG. 6A). If no breaking point is generated in the results preceding the IBP (i.e., no breaking point is identified prior to the ideal page size) the analysis continues following the IBP until a dynamic breaking point is determined (up to the specified maximum number of records).

A pre-determined distance may be identified numerically, for example, by an ideal page size (e.g., 100 records) and a range of records evaluate prior to (and following) the ideal page break (e.g., ±3 records). For this example, assume that record 602 (in FIG. 6A) represents the first record of a query result, that record 610 represents a hundredth record. Accordingly, the ideal page break follows record 610. However, further assume that a dynamic page break may occur anywhere between record 97 (e.g., record 604) and record 103 (e.g., record 616).

Referring again to method 400 of FIG. 4, steps 415 and 420 are performed to identify the first record (e.g. record 604) within the pre-determined distance from an IBP (e.g., record 610). More specifically, at step 415, a next result in sequence 300 is selected (e.g., record 602). If the selected result is not within the pre-determined distance from the IBP (e.g., any record between records 602 and 604), then at step 420 the next result in sequence 300 is selected (e.g., record 604). Note that in an alternative embodiment, steps 415 and 420 may be omitted and the first result within the pre-determined distance is directly selected, e.g., via indexing.

At step 425, the first record within the predetermined from the IBP (e.g., record 606) is analyzed together with the prior record (e.g., record 604) and the next record (e.g., record 608). In one embodiment, the records are evaluated to determine a "page-change factor." In general, the page change-factor indicates how a given result (e.g., record 606) is like result(s) before it (e.g., record 604) and the result after it (e.g., record 608). I In one embodiment, the page-change factor is determined using at least two values, where the first value is a numerical value representing combined similarities between the current result and the prior result, and the second value is a numerical value representing combines similarities between the current result and the next result. Each of the values may be calculated by adding pre-defined or determined value(s) for each of the detected similarities. In one embodiment, different kinds of the similarities or dissimilarities are associated with different values. If, upon detecting all of the similarities between the current result and the prior result and the current result and the next result and calculating respective first and second values, the second value is greater than the first value, the page-change factor is configured to indicate that the current result is more similar to its succeeding result (the next result) than to its preceding result (prior result).

Note that, in one embodiment, not all information from the generated results is used to determined similarities between the results. Rather only pre-defined or pre-determined portions are used (e.g., specific fields of tabular query results)

At step 430, the page-change factor may adjusted using a penalty value. Generally, the penalty value facilitates determination of a breaking point in a long sequence of relatively similar records. In one embodiment, the penalty value is a numeric value that is configured to be increased as the distance between the IBP and a current record increases. Initially, the penalty value may remain at zero until the IBP is reached (reflecting no penalty being incurred until the number of records in a page being generated exceeds the IBP).

In one embodiment, rather than adjusting the page-change factor based on the penalty value after the page-change factor has been calculated, the penalty value is a part of the page-change factor calculations of step 425. For example, the penalty value may be deducted from the first value when the current record is located after the IBP. Thus, the penalty value may decrease the significance of the identified similarities between the current record and the prior record. Accordingly, even if values in the current record are more similar to ones in the prior record than to ones in the next record, the penalty value may cause the page-change factor to indicate the opposite, and thus the dynamic breaking point would be determined, as described below with respect to step 455.

Alternatively, the penalty value may be used independently from the page-change factor. More specifically, rather than being used to modify the page-change factor or used directly in the calculations of the page-change factor, the penalty value may be compared to a pre-defined threshold, upon the reaching of which a dynamic breaking point would be identified by the currently selected record.

At step 435, the page-change factor is considered. If the page-change factor indicates that the selected record is more similar to the next record than to the prior record, method 400 proceeds to step 455 where a dynamic breaking point is defined. That is, once a record is identified that is more similar to the next record in the results (relative to the previous record(s)), a dynamic break point may be inserted into the query results. Thus, when pages are generated to render the query results, the dynamic break point identifies a boundary between pages generated and transmitted to a user. Otherwise, method 400 proceeds to step 440 for determining whether the penalty value needs to be adjusted.

At step 440, it is determined whether the selected record is located after the IBP. If yes, the penalty value is adjusted at step 445 and, at step 450, the next record in the sequence is selected.

The process of adjusting the penalty value may vary among different embodiments of the invention. In one embodiment, the penalty value is increased incrementally with each iteration. In another embodiment, the penalty value is increased progressively (i.e. non-linearly). A person skilled in the art will appreciate that there are numerous ways to adjust the penalty value as the search for the dynamic breaking point progresses. For example, in another embodiment, the penalty value combines multiple penalty values corresponding to portions of the results that are used to compare the records for similarity/dissimilarity, where each of the multiple penalty values is adjusted independently.

Furthermore, the penalty value may be adjusted with each new record being analyzed, including results preceding the IBP. For example, as records are analyzed that are closer to the IBP result, the penalty value may decrease, and the penalty value may increase for records following the IBP.

In one embodiment, when the selected record is located in the sequence earlier than the IBP (or is the IBP), method 400 proceeds directly to step 450, without adjusting of the penalty value. At step 450, the next record in the sequence selected and method 400 returns to step 425.

If it is determined at step 435 that the page-change factor indicates that the selected result is more similar to the next result than to the prior result, method 400 proceeds to step 455 where the dynamic breaking point is defined. At step 460, the results of the sequence from the first record to the dynamic breaking point result may be used to generate display of results. For example, as described above a web page may be generated that includes each record up to the currently identified breaking point. Subsequent pages may be constructed in a simper manner.

FIG. 5 is a flow diagram further illustrating a method for determining a dynamic breaking point in a table of query results, according to one embodiment of the invention. As shown, the method starts at step 510 where a sequence of results, e.g., sequence 300 shown in FIG. 3 generated in response to a user request, is received. As described above with respect to FIG. 4, such a sequence may include a first record and IBP, where the first result defines which result is displayed first on a page and the IBP is associated with a target number of records to display in a page.

In the embodiment illustrated in FIG. 5, results in the sequence are associated with a set of weights. In general, weights are used to customize the process of determining the dynamic breaking points. Different weights may be associated with different elements of the user request and generated results, e.g., query elements, individual fields of the query result, and the like. For example, associating a weight with one query element that is larger than a weight associated with another query element makes similarities detected based on the former query element more significant than similarities detected based on the latter query element.

Assume a user runs query (1) described above. Assume further that the following results have been returned in response to the query:

| 001 | PATIENT | LAB RESULT |
|---|---|---|
| 002 | 1 | 123 |
| 003 | 1 | 123 |
| 004 | 1 | 456 |
| 005 | 2 | 143 |
| 006 | 2 | 234 |
| 007 | 3 | 234 |
| 008 | 3 | 432 |
| 009 | 3 | 643 |

In this example Two fields are queried, "patient" and "lab result", and the records are ordered by 'patient' first and by 'lab result' second. In an embodiment where weights are established for query elements, a set of two weights may be associated with each of the results in this sequence, one for 'patient' and one for 'lab result.' Further, the weights may differ. For example, because the results are ordered by 'patient' first, in one embodiment, a weight associated with 'patient' may be larger than a weight associated with 'lab result.'

When rows 006-008 are analyzed to determine the page-change factor, for example, according to the method described above with respect to FIG. 4, the following similarities may be identified. As between rows 006 and 007, these rows are similar in that they are records of the same patient, i.e., patient 2. As between rows 007 and 008, these rows are similar in that they contain the same lab result, i.e., 234. If the weight associated with 'patient' is larger than the weight associated with 'lab result,' the similarity between the rows 006 and 007 takes precedence over the similarity between rows 007 and 008, and thus, the page-change factor may indicate that row 007 is more similar to row 006 than to row 008. However, if the weight associated with 'lab result' is larger than the weight associated with 'patient,' the similarity between the rows 007 and 008 would take precedence over similarity between rows 006 and 007, and thus, the page-change factor would indicate that row 007 is more similar to row 008 than to row 007. Note that if the weights are the same for 'patient' and 'lab result,' then the page-change factor may indicate that row 007 is no more similar to row 008 than to row 006, even though the rows themselves are not identical.

Results generated in response to the user request (e.g., a query) may include additional elements not expressly identified in the user request (e.g., by the query elements). For example, results of sequence 300 generated in response to query (1) may include additional fields, such as 'test location' and 'doctor' fields as shown in FIG. 3. In the manner described above, weights may also be associated with such additional elements (e.g., fields) to influence the determination of whether a particular record is similar to the next (and preceding) records.

Returning to FIG. 5, at step 515, a first set of weights is selected. And at step 520, the selected weights are used to determine a first breaking point, for example using the method described with respect to FIG. 4. Similarly, at steps 525 and 530, a second set of weights is selected and used to determine a second breaking point. At step 535, the breaking points are compared to one another determine a point that is closer to the IBP. Such a point is subsequently defines as the dynamic breaking point (steps 540 and 545). Method 500 completes with generating a display (e.g., a web page) which includes the records from the first result through the determined dynamic breaking point. Steps 515 through 545 may be repeated multiple times.

Because multiple breaking points may exist within a pre-defined range of results, as determined according to methods described herein, method 500 in particular facilitates finding of a dynamic breaking point that is relatively close or is the closest breaking point to the IBP. For example, where the preference is given the desired page size rather than to breaking early, multiple sets of weights may be used, as indicated by steps 515 and 525, and subsequently, the breaking point closest to the IBP be chosen.

However, in one embodiment, only one set of weights is used. Thus, at steps 515 and 525, the same weights are selected. More specifically, rather than selecting a first determined breaking point as the final dynamic breaking point (for example as described with respect to FIG. 4), an attempt is made to find a second breaking point among the results following the first breaking point. If such a breaking point is found at step 530, then if this breaking point is closer to the IBP than the first breaking point, it is chosen to be the final dynamic breaking point (steps 535-545).

Under some circumstances, the second breaking point may be located among the results following the IBP. In one embodiment, more preference is given to breaking points preceding the IBP rather than to breaking points that follow the IBP. Thus, in such an embodiment, any breaking point that is within the pre-defined distance from the IBP result and precedes the IBP is considered to be closer to the IBP than any breaking point following the IBP even when the actual distance between the former breaking point and the IBP is larger than between the latter breaking point and the IBP. Another embodiment implements an opposite strategy with respect to which breaking point is chosen as the final breaking point.

FIGS. 6A-6C illustrate a set of query results with various page breaking points. In particular, as discussed above, FIG. 6A illustrates the records showing in sequence 300 (of FIG. 3) broken in two pages at the IBP, where record 610 is the last record before the IBP. As can be seen in FIG. 6A, records 610 and 612 are rather similar. They are records for the same patient, have the same test location, and have the same doctor. However, breaking the sequence at the IBP causes these results to be displayed on different pages. FIGS. 6B and 6C, on the other hand, illustrate alternative and more meaningful ways of breaking the sequence 300 in two pages. In particular FIGS. 6B and 6C illustrate in more details how assigning weights to the result fields may influence determination of the dynamic breaking point.

In the embodiment shown in FIG. 6B, a larger weight has been assigned to the 'doctor' field, while in FIG. 6C a larger weight has been assigned the 'test location' field. As described above, in one embodiment, to determine a dynamic breaking point, the results are sequentially analyzed, starting with the first result within the pre-defined distance from the IBP result, e.g., record 606. When, during such a process, record 608 is analyzed, it is compared to records 606 and 610 for similarities. As between records 606 and 608, both records relate to the same patient, i.e., Patient 1, and have the same test location, i.e., Location A. As between records 608 and 610, both records relate to the same patient, i.e., Patient 1, and have the same doctor, i.e., Doctor Jones.

In an embodiment using no weights or in an embodiment where weights associated with the 'test location' and 'doctor' fields are the same, record 608 is no more similar to record 610 than to record 606. However, in the embodiment shown in FIG. 6B, because the 'test location' field is associated with a larger weight, record 608 is more similar to record 610 than to record 606. Accordingly, the dynamic breaking point is defined as a record immediately preceding the record that is currently analyzed, and thus, record 606 would be the dynamic breaking point.

In contrast, in the embodiment shown in FIG. 6C, record 608 is more similar to record 606 than to record 610 because the larger weigh is associated with the 'test location' field. Accordingly, the method for determining the dynamic breaking point would proceed to record 610, and record 610 would be compared to records 608 and 612. As between records 608 and 610, both records relate to the same patient, i.e., Patient 1, and have the same doctor, i.e., Doctor Jones. As between records 610 and 612, both records relate to the same patient, i.e., Patient 1, have the same doctor, i.e., Doctor Jones, and have the same test location, i.e., Location B. Accordingly, record 610 is more similar to record 612 than to record 608, which is further emphasized by extra weight associated with the 'test location' field. Therefore, the dynamic breaking point would be defined as record 608.

Note however, that though there are more similarities between records 610 and 612 than between records 610 and 608, associating a larger weight with the 'doctor' field may prevent finding of record 610 to be more similar to record 612 than record 608 when the assigned weight is sufficiently large. Note further, according to method 500 described with respect to FIG. 5, breaking points shown in FIGS. 6B and 6C may be determined, including a third breaking point shown in FIG. 6C, i.e., result 612, and then, the breaking closest to the IBP result may be chosen as the final dynamic breaking point. In the present example, both records, 608 and 612, are closer to IBP result 610 than record 606. Record 608 also precedes record 610, unlike record 612. Accordingly, if the preference is given for a page that includes lesser records than the ideal page number, record 608 would be selected as the final dynamic breaking point, and record 612 otherwise.

Note, that though the embodiments of the present invention are primarily discussed in a context of a database abstraction model, database management system, and respective user interface, this is merely an example. The described methodologies may be similarly employed by various data display tools in different environments, including but not limited to search engines.

Advantageously, as described herein, embodiments of the invention enable displaying results generated in response to a user request in a meaningful manner using flexible size pages. For example, when the meaning of the data is more important than the exact number of results on a page, determining a dynamic breaking point for a given page, according to embodiments of the present invention, allows displaying closely related results to be on the same page. Further, embodiments of the invention provide for conserving of computing system resources involved in generating and displaying of the results. For example, displaying related results on the same page facilitates users' comprehension, and consequently, the number of times an average user must flip back and forth between the pages to consider the results and the numbers of pages accessed by the average user are reduced. Therefore, computing resources, such as memory, are conserved.

While the foregoing is directed to embodiments of the present invention, other and further embodiments of the invention may be devised without departing from the basic scope thereof, and the scope thereof is determined by the claims that follow.

What is claimed is:

1. A computer-implemented method for determining one or more dynamic page breaks to include in a database query result generated in response to a user request, comprising:
receiving the database query result, wherein the database query result includes a plurality of records in a specified sequence;
evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record;
upon determining the page-change factor indicates that the first record is more similar to the record following the first record than to the record prior to the first record, inserting a dynamic page break in the database query result, wherein the first record is assigned to a page following the dynamic page break; and
upon determining the page-change factor indicates that the first record is more similar to the record prior to the first record than to the record following the first record, relative to the sequence, sequentially evaluating at least the record following the first record of the sequence to determine at least a second page-change factor, wherein the sequential evaluation continues until a dynamic page break is inserted, based on the page change factor determined for one of the records following the first record, and wherein at least the first record is assigned to a page preceding the dynamic page break.

2. The method of claim 1, further comprising:
receiving a request to view a first page of query results;
in response, generating the requested first page of query results, wherein the first page of query results includes an initial record and each record of the sequence following the initial record, up to the dynamic page break; and
returning the first page of query results to a user.

3. The method of claim 1, wherein the first page of query results comprise a formatted HTML document presenting the sequence of records included in the first page of query results in a tabular format.

4. The method of claim 1, further comprising:
receiving a request to view a next page of query results; and
in response, generating the requested next page of query results, wherein the first page of query results includes a record following the dynamic page break and each record, in the sequence, up to a record associated with a second dynamic break point.

5. The method of claim 1, further comprising, receiving an break point value (BPV), wherein the BPV identifies a target number of records to include in a page of results generated to present a portion of the query result to a user, and wherein the first record occurs in the sequence a predefined number of records before the target number of records.

6. The method of claim 5, wherein a penalty value is assigned to the page-change factor each record sequentially evaluated following the target number of records.

7. The method of claim 1, wherein the first measure of similarity and the second measure of similarity are generated by comparing one or more fields included in the first record with a corresponding one or more fields in the record prior to the first record and the record following the first record.

8. A non-transitory computer-readable storage medium containing a program which, when executed, performs an operation for determining one or more dynamic page breaks to include in a database query result generated in response to a user request, the operation comprising:

receiving the database query result, wherein the database query result includes a plurality of records in a specified sequence;

evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record;

upon determining the page-change factor indicates that the first record is more similar to the record following the first record than to the record prior to the first record, inserting a dynamic page break in the database query result, wherein the first record is assigned to a page following the dynamic page break; and;

upon determining the page-change factor indicates that the first record is more similar to the record prior to the first record than to the record following the first record, relative to the sequence, sequentially evaluating at least the record following the first record of the sequence to determine at least a second page-change factor, wherein the sequential evaluation continues until a dynamic page break is inserted, based on the page change factor determined for one of the records following the first record, and wherein at least the first record is assigned to a page preceding the dynamic page break.

9. The non-transitory computer-readable storage medium of claim 8, wherein the operation further comprises:

receiving a request to view a first page of query results;

in response, generating the requested first page of query results, wherein the first page of query results includes an initial record and each record of the sequence following the initial record, up to the dynamic page break; and returning the first page of query results to a user.

10. The non-transitory computer-readable storage medium of claim 8, wherein the first page of query results comprise a formatted HTML document presenting the sequence of records included in the first page of query results in a tabular format.

11. The non-transitory computer-readable storage medium of claim 8, wherein the operation further comprises:

receiving a request to view a next page of query results; and in response, generating the requested next page of query results, wherein the first page of query results includes a record following the dynamic page break and each record, in the sequence, up to a record associated with a second dynamic break point.

12. The non-transitory computer-readable storage medium of claim 8, wherein the operation further comprises, receiving an ideal break point value (BPV), wherein the BPV identifies a target number of records to include in a page of results generated to present a portion of the query result to a user, and wherein the first record occurs in the sequence a predefined number of records before the target number of records.

13. The non-transitory computer-readable storage medium of claim 12, wherein a penalty value is assigned to the page-change factor each record sequentially evaluated following the target number of records.

14. The non-transitory computer-readable storage medium of claim 8, wherein the first measure of similarity and the second measure of similarity are generated by comparing one or more fields included in the first record with a corresponding one or more fields in the record prior to the first record and the record following the first record.

15. A system, comprising:

a processor; and a memory storing an application, which, when executed by the processor is configured to perform an operation for determining one or more dynamic page breaks to include in a database query result generated in response to a user request, the operation comprising:

receiving the database query result, wherein the database query result includes a plurality of records in a specified sequence, evaluating, for a first record of the sequence, a record prior to the first record and a record following the first record, relative to the sequence, to determine a page-change factor based on (i) a first measure of similarity for the first record and the record prior to the first record and (ii) a second measure of similarity for the first record and the record following the first record, upon determining the page-change factor indicates that the first record is more similar to the record following the first record than to the record prior to the first record, inserting a dynamic page break in the database query result, wherein the first record is assigned to a page following the dynamic page break, and upon determining the page-change factor indicates that the first record is more similar to the record prior to the first record than to the record following the first record, relative to the sequence, sequentially evaluating at least the record following the first record of the sequence to determine at least a second page-change factor, wherein the sequential evaluation continues until a dynamic page break is inserted, based on the page change factor determined for one of the records following the first record, and wherein at least the first record is assigned to a page preceding the dynamic page break.

16. The system of claim 15, wherein the operation further comprises, receiving an ideal break point value (BPV), wherein the BPV identifies a target number of records to include in a page of results generated to present a portion of the query result to a user, and wherein the first record occurs in the sequence a predefined number of records before the target number of records.

17. The system of claim 15, wherein a penalty value is assigned to the page-change factor each record sequentially evaluated following the target number of records.

18. The system of claim 17, wherein the operation further comprises:

receiving a request to view a next page of query results; and in response, generating the requested next page of query results, wherein the first page of query results includes a record following the dynamic page break and each record, in the sequence, up to a record associated with a second dynamic break point.

19. The system of claim 15, wherein the operation further comprises:

receiving a request to view a first page of query results;

in response, generating the requested first page of query results, wherein the first page of query results includes an initial record and each record of the sequence following the initial record, up to the dynamic page break; and returning the first page of query results to a user.

* * * * *